Oct. 26, 1948.　　　C. A. WIKEN ET AL　　　2,452,089
UNIVERSAL WORK HEAD
Filed June 15, 1944　　　　　　　　　　　　2 Sheets-Sheet 1
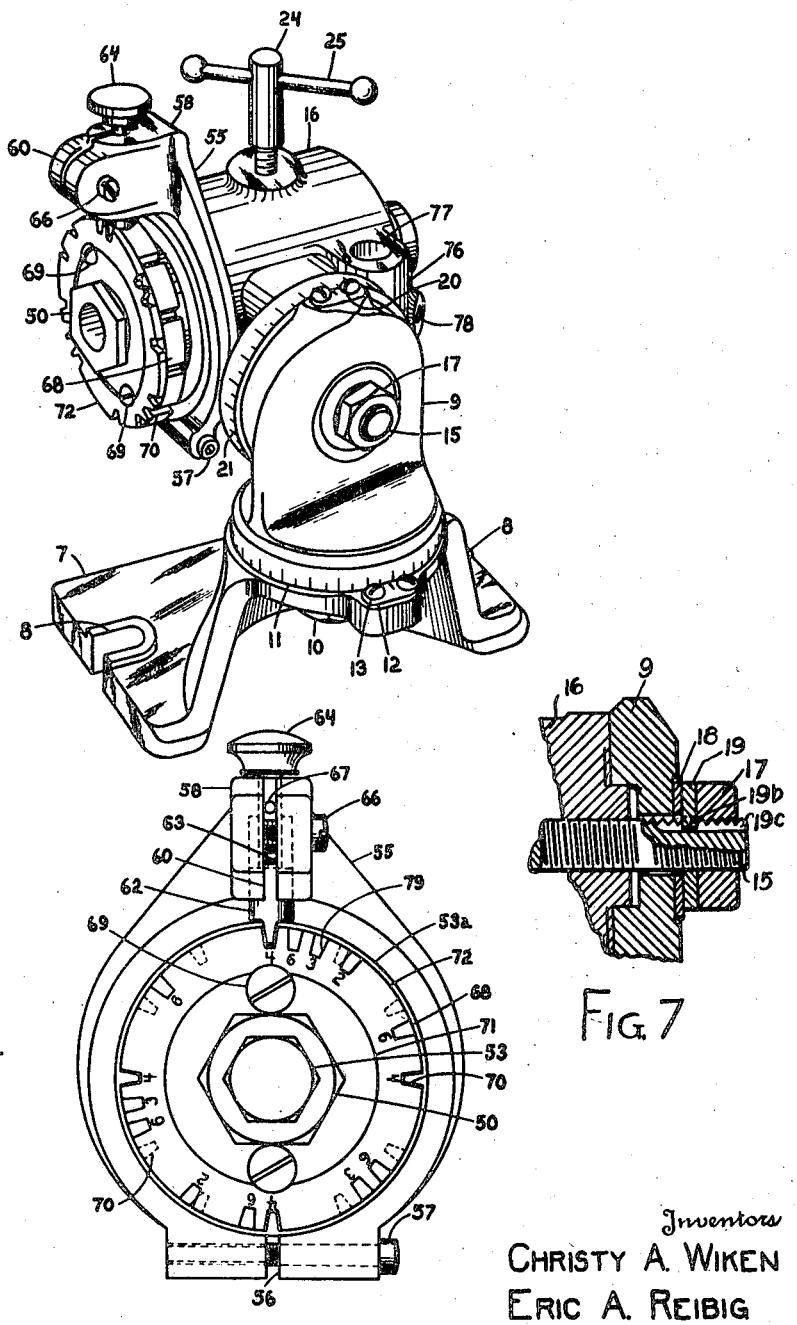
Inventors
CHRISTY A. WIKEN
ERIC A. REIBIG Oct. 26, 1948.  C. A. WIKEN ET AL  2,452,089
UNIVERSAL WORK HEAD
Filed June 15, 1944  2 Sheets-Sheet 2
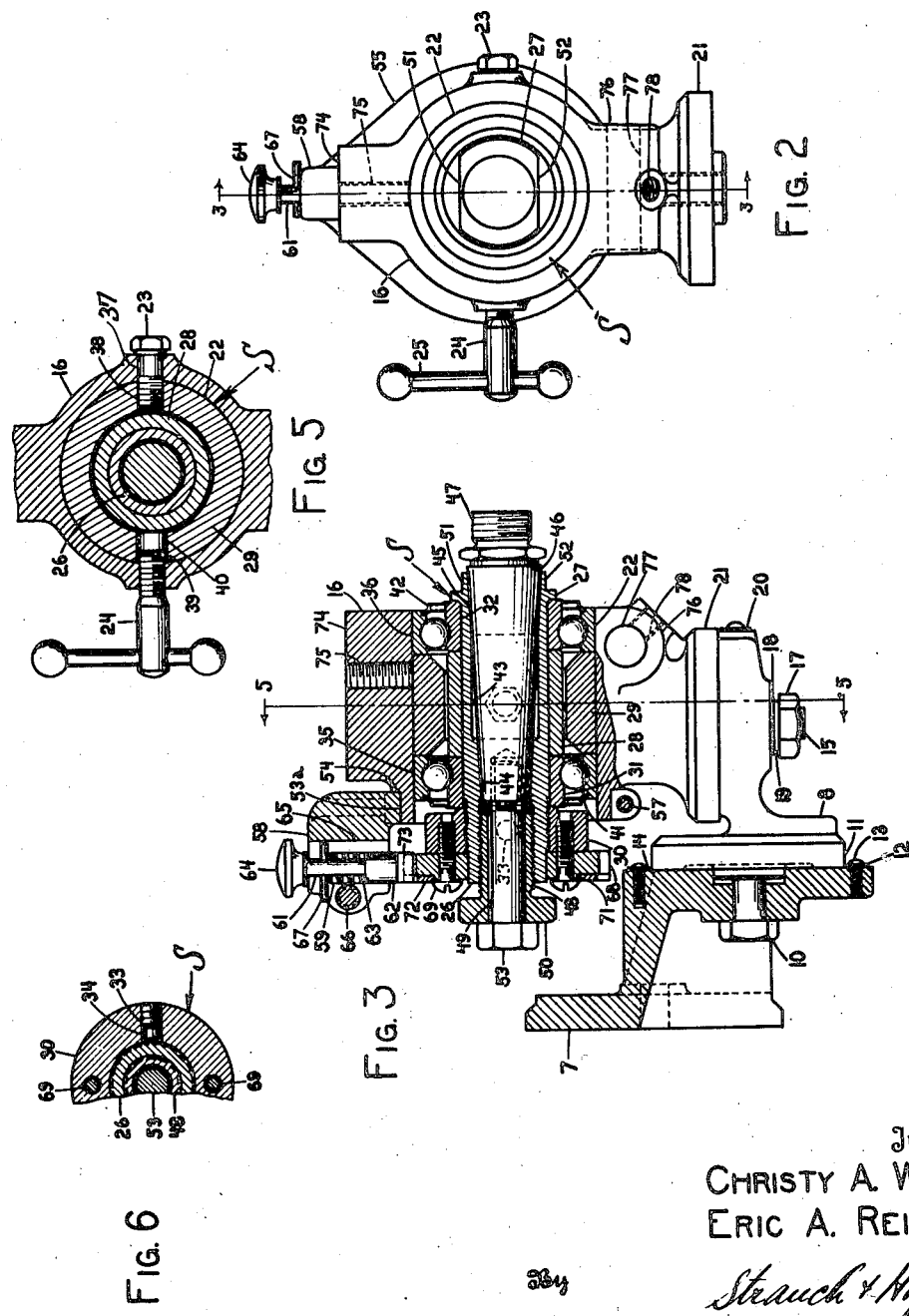
Inventor
CHRISTY A. WIKEN
ERIC A. REIBIG Patented Oct. 26, 1948

2,452,089

UNITED STATES PATENT OFFICE 2,452,089

UNIVERSAL WORK HEAD

Christy A. Wiken and Eric A. Reibig, Milwaukee, Wis., assignors, by mesne assignments, to Rockwell Manufacturing Company, Pittsburgh, Pa., a corporation of Pennsylvania Application June 15, 1944, Serial No. 540,509

8 Claims. (Cl. 90—57)

This invention relates to work holding and locating devices, and in particular to such devices operable to hold work pieces in a plurality of indexed positions or stations for machine tool operations.

Work holding devices which provide indexing means to indicate or locate the position of the work piece in a plurality of angularly spaced stations have taken various forms. Some of these utilize index discs or wheels having a large number of notches, holes, or the like to provide indexing positions or stations. Other index discs are readily removable so that a disc having the particular desired number of angularly spaced index positions or stations may be substituted. In other forms, where the index disc is provided with a comparatively large number of indexing stations, means are provided to block out one or more of the grooves or holes forming the index stations. For example, these means have taken the form of single lugs to be inserted into each of the grooves to be blocked out, and of shields or the like which block out all of the stations except the particular ones which it is desired to use. In either case, the lugs have to be removed and others inserted, or the shields have to be removed and others substituted, when an indexing operation involving a different number of stations is contemplated.

The primary object of the present invention is the provision of an indexing work holding head wherein a rotatable holder provided with an index wheel or disc having a fixed number of stations is combined with a selector plate which is shiftable to various positions to block out different combinations of the stations on the index disc or wheel.

Another important object of our invention is to provide an indexing work holding head wherein a collar which carries an index dog is adjustably fixed on the head so that the index dog can be shifted to any desired position to cooperate with an index disc affixed to a rotatable work holder which is journalled on the head.

It is another object of our invention to provide an indexing work holding head wherein a rotatable work holding sleeve is journalled in pre-loaded, sealed and lubricated for life bearings, by which means all end play is eliminated, this being important in the grinding of cutters and other tools.

Another object is the provision in a work holding head of a journalled sleeve having an internal taper which receives an outside tapered adapter, the sleeve having a threaded push out nut which screws into the sleeve to force out the adaptor while the sleeve is held against rotation.

Still another object is to provide the push out nut with a central passage accommodating a cap screw which engages threads in the adaptor to draw it into the sleeve.

It is another object to provide an improved method of assembling and grinding the internal taper in a rotatable sleeve journalled in a work head, wherein the taper is ground after assembly of the unit, to eliminate errors in the bearings and work head.

Other objects will become apparent as the description proceeds in connection with the attached drawings, wherein:

Figure 1 is a perspective view of a universally adjustable work head incorporating our invention.

Figure 2 is a front elevation of the work head assembly detached from the universally swiveled mounting.

Figure 3 is a partial sectional view along the line 3—3 of Figure 2, looking in the direction of the arrows and showing the universally swiveled mounting.

Figure 4 is an enlarged end elevation of some of the elements shown in section in Figure 3.

Figure 5 is a partial sectional view along the line 5—5 of Figure 3, and looking in the direction of the arrows.

Figure 6 is a sectional view in a plane parallel to that of Figure 5 and showing the means by which the collar which preloads the bearing assembly is locked to the central sleeve of the assembly.

Figure 7 is a partial sectional view through the swivel connection between the headstock casting and the swivel casting illustrating the novel washer assembly for permitting the swivelling operation without loosening the securing stud.

As shown in Figure 1 a base casting 7 has a plurality of bossed recesses 8 which accommodate bolts or the like for fastening the base 7 to a support. A swivel angle casting 9 is pivotally mounted about a vertical stud on the base 8 and is clamped in any angular position by tightening the hexagonal nut 10 on the stud and under the base 7. The swivel angle casting 9 is provided with an angular scale 11 along its lower periphery, which cooperates with a groove in an adjustable index plate 12 on the base 7. The index plate 12 is adjustably fastened to the base 8 by means of machine screws 13 passing through slots in the plate. Another index plate 14 is mounted similarly to plate 12 on the base 7 but 180° away from plate 12, so that an index is available when plate 12 is difficult to see because of the angular position of the headstock carried by the casting 9.

A stud 15 is tapped into a headstock casting 16 and attaches the headstock to the swivel angle casting 9 for pivotal movement about a horizontal axis. As shown in Figures 1 and 3 the stud 15 extends through the swivel angle casting 9 and a hexagonal nut 17 on the end of the stud clamps the headstock to the swivel angle casting 9 in any angular position. On the stud 15, and between the nut 17 and a boss on the casting 9, are a spring washer 18 and a lock washer 19, the washer 19 being between washer 18 and the nut. The washer 19 has an internal projection 19b which fits into a key slot 19c in the stud 15, to hold the washer against rotation when the nut is tightened to hold the headstock in position.

An index plate 20 having an index mark is adjustably fastened on the top of the swivel angle casting 9 in a manner similar to index plate 12. The index plate 20 cooperates with an angular scale 21 on the headstock 16, to indicate the angular position of the headstock with respect to the swivel angle casting 9.

The headstock 16 has a large diameter central bore 22 at right angles to the axis of the stud 15. As shown in Figures 3 and 5, a sleeve and bearing assembly cartridge S is located and fixed within the bore 22 by means of a cap screw 23. The sleeve and bearing assembly comprises a central sleeve 26 having an internal bore. Adjacent one end the sleeve 26 has an external annular shoulder 27. Mounted on the exterior of the sleeve 26 are a pair of ball bearing assemblies separated by inner and outer spacer sleeves 28 and 29. Near the end remote from the shoulder 27, the sleeve 26 is provided with external threads. A collar 30, which has threaded engagement with these threads, clamps the inner races 31 and 32 of the ball bearings and the inner spacer sleeve 28 against the shoulder 27 on the central sleeve 26. Collar 30 is tightened to an extent such as to pre-load the sleeve and bearing assembly. As shown in Figure 6 a radial bore in collar 30 is tapped for a set screw 33. Between the set screw and the threads on sleeve 26 is a brass plug 34 designed to prevent injury of the threads when set screw 33 is tightened. After the collar 30 is tightened to the required amount against inner bearing race 31, it is locked in place by jamming the plug 34 against the threads on sleeve 26 by tightening the set screw 33.

The bearings are of the type which will take both thrust and radial loads since the balls run in grooves in both the inner and outer races, and when the inner races 31 and 32 are clamped by the collar 30 the outer spacer sleeve 29 is simultaneously clamped between the outer bearing races 35 and 36. The complete bearing assembly is removable as a unit from the central bore 22 in the headstock. When the assembly is fixed in the headstock the central sleeve 26 rotates with the ball bearing inner races 31 and 32 and the inner spacer sleeve 28 while the outer spacer sleeve 29 and the outer bearing races 35 and 36 are held against rotation in the headstock. The ball bearings are lubricated for life and seals 41 and 42 prevent the loss of lubricant or the entrance of dust and dirt, etc.

The sleeve and bearing assembly is held fixed within the bore 22 by means of the cap screw 23 which passes through a tight fitting hole 37 in the headstock and engages a tapped hole 38 in the outer spacer sleeve 29. When screwed all the way in, the cap screw 23 does not engage the surface of the inner spacer sleeve 28 which is thereby left free to turn, together with the central sleeve 26.

The lock screw 24 provides means to lock the sleeves 26 and 28 against rotation whenever that is desired. The screw 24 is threaded radially in the headstock 16 towards the axis of the sleeve 26. The outer spacer sleeve is provided with an aligned bore 39 which is greater in diameter than the threaded hole in the headstock through which screw 24 passes. A brass plug 40 slides in the bore 39 and since it is too large in diameter it will not fall out of the threaded hole if the screw 24 is removed. When the screw 24 is tightened against the brass plug 40, the sleeves 26 and 28 are locked against rotation by the plug 40 pressing against the outer surface of the sleeve 28. The brass plug thus provides a cushioning and wear member between the end of screw 24 and sleeve 28 thereby preventing the screw from marring the surface of sleeve 28 and protecting the end of screw 24 from distortion and consequent injury to the thread.

As shown in Figure 3, the central bore of sleeve 26 has a cylindrical portion 43 separating two slightly tapered portions 44 and 45. An adaptor 46 having outer tapered portions mating with portions 45 and 46 is seated within sleeve 26. At its outer end the adaptor may be provided with threads 47 for engagement with a tool or work holder such as a chuck or the like, although the threads are by way of example only, since any suitable fastening means may be used.

At the same end on which the collar 30 is threaded, the central sleeve 26 is provided with internal threads into which a push out bolt 48 is threaded. Bolt 48 has an axial bore 49 extending through it and a hexagonal head 50 on its outer end. At the opposite end from the push out bolt 48, the central sleeve has a pair of opposed flats 51 and 52 shown in Figure 2. In order to push the adaptor 46 out of the sleeve 26, a wrench is applied to the flats 51 and 52 to hold the sleeve 26 against rotation. Simultaneously, a wrench is applied to the head 50 of the push out bolt and the push out bolt is screwed into sleeve 26 until it engages the inner end of the adaptor and pushes it out. Once loosened from its tapered seat in sleeve 26, the adaptor may be slid out from the sleeve.

While adaptor 46 may be secured in place by tapping its exposed end for grinding layout and like work, a draw in cap screw 53 has its head seated against the head 50 on the push out bolt and passes through the bore 49, being threaded into the inner end of the adaptor 46. When the push out bolt 48 is withdrawn sufficiently to allow the adaptor to seat completely, the adaptor can be forcefully drawn into its seat by holding sleeve 26 at the flats 51 and 52 and turning the draw in cap screw with a wrench. The push out bolt 48 must be held against rotation while this is done. After the adaptor has been drawn tightly into its seat, the draw in screw 53 may be removed or loosened, since the adaptor will normally be held in the sleeve 26 by the friction of the mating tapered seats 44 and 45. However, if the work holder is being used for milling or like operations where vibrations occur, screw 53 is left tight and serves to lock the adaptor against loosening due to vibration. Whenever it is desired to push the adaptor out of sleeve 26, the cap screw 53 must first be loosened and removed.

At the end adjacent the collar 30, the headstock 16 has an annular external portion 53a of reduced diameter which terminates in a shoulder 54. The reduced portion is accurately machined to be in axial alignment with the central bore 22. Seated on the machined portion and against shoulder 54 is an index holder collar or ring 55, which is accurately fitted and which has a radial slot 56 therethrough. A cap screw 57 passing through the two ends of the collar at the slot 56, and threaded into one of the ends, is tightened to clamp the collar 55 to the headstock in any desired angular position.

Diametrically opposed to the slot 56 the collar 55 is provided with a lug 58, shown in Figures 1 to 4. The lug is provided with a radial bore 59 containing a spring 63, and a coaxial smaller bore. An index pin having a stem 61 fitting the smaller bore and a larger portion 62 fitting the bore 59, is slidable and rotatable in the coaxial bores. The coil spring 63 between the portion 62 and the smaller bore urges the index pin radially inwards. A nut 64 is threadedly fastened to the outer end of stem portion 61 to permit assembly of the index pin and provide a hand hold for operation of the pin. The lug 58 is partially split by a radial slot 60, extending the full radial depth of the lug but not through its entire width, terminating at 65 as shown in Figure 3. The bore 59 and the coaxial smaller bore are reamed for an accurate fit of the index pin, and a cap screw 66, when tightened, draws the slot 65 closer and reduces the diameter of the bores. The screw 66 is drawn up tight enough to eliminate play in the index pin, but still allow it to be moved inwardly by the spring 63 or outwardly by the operator.

At its inner or toothed end 73 the index pin is flattened on two sides to a shape somewhat similar to that of a rack gear tooth, for mating engagement with notches or stations 70 in the peripheral edge of an index disc, as will be described. In order to permit the index pin to be locked out of engagement with the index disc, a straight pin 67 passes diametrically through and is fixed in the stem 61 of the index pin. In order to seat the toothed end of the index pin in a notch in the index disc, the index pin is turned so that pin 67 slides in the slot 66 whereupon the spring 63 urges it towards the disc. To lock the index pin out of engagement with the index disc it is pulled out until the pin 67 is clear of slot 60 and then rotated 90°. Pin 67 will then rest on top of the lug and across slot 60 as shown in Figure 2. Pin 67 projects farther from the stem 61 on one side than the other, and its longest portion is longer than the distance between the stem and the side wall of slot 60 indicated by numeral 65 of Figure 3. For the toothed portion 73 of the index pin to engage the index disc, the index pin must therefore be always aligned so that the long portion of pin 67 slides in the open end of the slot 60, or the left end, as viewed in Figure 3. This arrangement makes certain that the index pin always has the same position when engaging the index disc which is important since the tapered sides of the toothed portion 73 which engage the index disc may not be equidistant from the axis of the index pin.

The annular index disc, designated by the reference number 68, has a central bore through which the sleeve 26 passes, and is securely fastened as by bolts 69 to the collar 30. The disc 68 is shown in section in Figure 3 and in elevation in Figure 1. Along its periphery it is provided with a series of equiangularly spaced notches or stations 70. By way of example, the drawings (Figure 4) show twelve such notches spaced 30° apart, and the central sleeve 26 with the adaptor 46 can be indexed to 12 equiangularly spaced stations by engagement of the index pin 62 with the notches 70.

On the same side as the heads of the bolts 69 the index disc has an annular recess extending from a shoulder 71 to the outer edge of the disc. An annular selector plate 72, of the same outer diameter as the disc 68, but slightly thicker than the depth of the recess, is seated in the recess. As shown in Figures 3 and 4 the inside diameter of the selector plate, where it fits over the shoulder 71, is such that the outer portions of the heads of the bolts 69 overlie the selector plate. With this arrangement the heads of the bolts bear against the selector plate rather than against the disc 68. When the bolts are tightened the plate is thus clamped against the disc 68 by the heads of the bolts. It is to be understood that separate bolts may be used for fastening the disc 68 to the collar 30 and for fastening the plate 72 to the disc 68, in which case the disc fastening bolt heads 69 would not overlie the selector plate. The separate bolt heads would instead overlie it. In either case the fit of the selector plate over the shoulder 71 and in the peripheral recess in disc 68 is such that the plate can be angularly rotated with respect to the disc when the bolts which clamp the plate to the disc are loosened.

It is the function of the selector plate 72 to provide different combinations of indexing stations by shifting it from one angular position to another with respect to the disc 68.

In the example shown in Figure 4 the index disc 68 has twelve equianguarly spaced notches 70 and twelve indexed stations are thus provided. The selector plate 72 has fifteen notches 79 spaced as indicated in Figure 4, and the selector plate is intended to be used in any of four positions with respect to the index disc. When in one position the selector plate covers 10 of the notches 70 in the index disc and leaves two notches, 180 degrees apart, open for engagement by the index pin 62. Since the thickness of the toothed portion 73 of the index pin is slightly greater than the combined thickness of the disc 68 and the plate 72, as shown in Figure 3, the tootohed portion 73 is prevented from entering those notches in the disc 68 which are covered by the selector plate. The plate being of the same outer diameter as the disc, the portion 73 will merely ride on the plate 72 instead of the disc 68 when the covered notches pass under it.

In a second position nine of the notches 70 in the disc are covered, and three notches which are 120 degrees apart are open and available as indexing stations. In a third position, that shown in Figure 4, eight of the notches are covered, and four notches which are 90 degrees apart are available as indexing stations. In the fourth position six notches are covered, and there are six notches, each sixty degrees apart, available as indexing stations. The spacing of the notches in the plate 72 and in the index disc 68 shown in Figure 4 is by way of example only and it will be understood that other combinations of spacing in both the disc and selector plate may be used, and that the combinations of indexing stations thus provided can be other than equiangularly spaced.

The function of the notches 79 in the selector plate 72 is different from that of the notches 70 in the index disc 68 in that they are designed only to permit the toothed portion 73 of the index pin to enter the notches 70 in the index disc. The angular position of the central sleeve 26 is accurately determined and positively held by the snug fit of the toothed portion 73 with the notches 70. The notches in the selector plate are therefore slightly larger than the notches 70, so that the toothed portion 73 of the index pin does not contact them when it is seated in one of the notches 70.

As shown in Figure 4, the notches in the selector plate are numbered 2, 3, 4 and 6. This is to aid the operator in setting the selector plate in its proper position relative to the index disc to obtain the number of indexing stations desired. In order to obtain four stations, as provided in Figure 4, the bolts 69 are loosened so that the selector plate is free to rotate with respect to the index disc. The selector plate is placed so that a notch marked "4" completely uncovers and is aligned with any one of the notches 70 in the index disc. The plate and disc are then held in this relative position while the bolts 69 are tightened against the plate. Four of the notches 70, ninety degrees apart, are thus completely uncovered, the remainder being either completely or partially covered by the selector plate so that the toothed portion 73 of the index pin can enter only the completely uncovered notches 70.

When two indexing stations are desired the selector plate is shifted so that a notch marked "2" is aligned with and completely uncovers one of the notches 70. It will now be found that the only other notch 70 which is completely uncovered is that one 180 degrees away from the one aligned with the notch marked "2." In a similar manner the selector plate may be selectively placed so that one of the notches marked "3" or "6" is aligned with a notch 70, to uncover three or six notches respectively in the disc 68.

As shown in Figure 4, there are four of the notches 79 in the selector plate near the index pin, the one marked "4" being aligned with the toothed portion 73 and with a notch 70 in the index disc. The notches 79 to the right of the one marked "4" are marked 6, 3 and 2, respectively. The notch 6 is spaced 10 degrees to the right of notch 4. Notch 3 is 10 degrees to the right of notch 6, and notch 2 is 15 degrees to the right of notch 3. This establishes the position of the remaining notches 79 from those specifically located since all those marked "4" are 90 degrees apart; those marked "6" are 60 degrees apart; those marked "3" are 120 degrees apart; and those marked "2" are 180 degrees apart.

By this combination of index disc and movable selector plate four different arrangements of equiangularly spaced indexing stations are provided. By removing the selector plate the index disc alone provides a fifth arrangement having twelve indexing stations.

The adjustable index holder collar 55 provides a means for having the first indexing station at any desired angular position with respect to the headstock 16. If the lug 58 were integral with the headstock, the first indexing station would always be in the same location. With our device, however, the position of the first indexing station can be shifted by unscrewing the cap screw 57, moving the collar so that the index pin 62 is in the desired angular position, and then tightening the cap screw 57 again.

In order to reduce the errors which might arise due to inaccuracies in the assembly carried by the headstock, we have provided an improved assembly and final machining method. The sleeve and bearing assembly which is held in the headstock by means of the cap screw 23 is assembled as a unit and placed in the bore 22 of the headstock. Cap screw 23 is inserted and tightened to fasten the assembly in the headstock. The tapered sections 44 and 45 within the sleeve 26, which have been only rough turned before assembly, are now finish ground while the sleeve is rotated. This method provides a headstock assembly having an accuracy of .0002 to .0003 inch.

As shown in Figures 2 and 3, the headstock 16 has a flat portion or pad 74 having a tapped hole 75 extending into the body of the headstock. Any desired jig or fixture can be attached to the pad 74 on the headstock by a cap screw or the like threaded into the hole 75. The headstock is also provided with an external boss 76 (Figures 1, 2 and 3) having a bore 77 therethrough. Jigs or fixtures may also be assembled to the headstock by means of a rod or bolt or the like passing through the bore 77. Such rod or bolt can be clamped in the bore 77 by means of a set screw or bolt in the tapped hole 78 which extends radially outward from the bore.

Our assembled work holding device provides improved and simplified means for indexing a work piece for machining operations. A variety of indexing operations having differently spaced angular positions can be readily accomplished without substituting new index discs or selector plates because it is only necessary to loosen a couple of bolts and move the selector plate when changing from an operation involving one fixed number of indexed positions to another operation requiring a different fixed number of indexed positions. In addition, means are provided to have the position of the first indexed station or position at any desired angular position with respect to the headstock. By the use of the draw in cap screw and the push out bolt, the adapter which seats in the central sleeve having the internal taper is easily drawn into place and as easily removed from the central sleeve without the use of any blows thereon by means of hammers or drive pins, which blows frequently damage and disturb the adjustment of the work holding device. A sealed, lifetime lubricated and pre-loaded cartridge unit is provided and can easily be removed and a new unit substituted when any damage is suffered by the assembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Indexing means for a work locating device wherein a work holder is journalled for rotation in a headstock, comprising an index disc attached to the work holder; an index pin attached to the headstock and movable radially with respect to the axis of rotation of said work holder towards said index disc, a series of spaced peripheral notches in said disc and engageable by said index pin to hold said disc and work holder against rotation; a selector plate adjustably attached to said index disc for rotation therewith but operable to be shifted with respect to said index disc about the axis of said work holder, said selector plate being of substantially the same diameter as said index disc and also having spaced peripheral notches arranged so they uncover different combinations of notches in the index disc when the plate is shifted from one to another position with respect to the disc whereby said selector plate blocks the engagement of said index pin with the notches in said index disc except those uncovered by said selector plate.

2. In a work holding device, a headstock; a central sleeve journalled for rotation in said headstock; a shoulder on said sleeve adjacent one end thereof; a pair of bearing assemblies on said sleeve and journalling said sleeve in said headstock; a collar adjustably mounted on said sleeve and operable to clamp said bearing assemblies against said shoulder; sealing means preventing the entrance of dirt and the loss of lubricant from said bearings; said sleeve and bearings forming a preloaded assembly mounted as a unit in said headstock; means fastening said preloaded assembly in said headstock; and means carried by said sleeve and said headstock, operable to index the angular position of said sleeve within said headstock.

3. The device described in claim 2 wherein said pair of bearing assemblies are longitudinally separated by a pair of concentric spacer sleeves, the inner of said sleeves being compressed between the inner races of said bearing assemblies and the outer of said sleeves being compressed between the outer races of said bearing assemblies; said means which fasten said preloaded assembly within said headstock engaging the outer of said sleeves; and releasable means engageable with the inner of said sleeves to prevent its rotation within said headstock.

4. A unitary cartridge assembly for rotatably supporting a work holder in a headstock comprising a sleeve having an internal taper adapted to receive said work holder and a radially extending external shoulder at one end to provide an axial abutment surface; a pair of axially spaced bearings mounted on the external surface of said sleeve with the inner race of one bearing in abutting engagement with said shoulder; inner and outer spacer sleeves respectively engaging the inner and outer races of said bearings to maintain them in predetermined spaced relationship along said sleeve; a collar threaded on the other end of said sleeve into engagement with the inner race of said other bearing whereby said spaced bearings and said inner and outer spacer sleeves are moved axially toward said shoulder to clamp the inner races of said bearings and said inner spacer sleeve to said sleeve and preload said bearings through the abutting engagement of said outer spacer sleeve and the outer races of said bearings, the said other end of said sleeve being internally threaded; an externally threaded hollow bolt threaded therein and adapted to be threaded into abutting engagement with an end of said work holder to eject said work holder; and a removable cap screw having a head engaging the head of said hollow bolt and a threaded shank extending through said hollow bolt and adapted to threadedly engage said end of said work holder to draw said work holder into seating engagement on said internal taper.

5. An indexing assembly for cooperation with a rotatable work holder comprising an index plate having indexing notches and a central opening adapted to mount said disc on said work holder; an axially directed annular shoulder on said index disc providing an annular mounting surface concentric with the axis of rotation of said work holder; and a selector plate mounted on said annular mounting surface for relative angular movement with respect to said index plate and having notches arranged to uncover preselected notches of said index disc and block out the remaining notches of said index disc whereby various indexing arrangements may be selectively obtained by merely rotating said selector plate with respect to said index plate.

6. The combination defined in claim 5 together with means for locking said selector plate in any desired angular position with respect to said index plate.

7. The combination defined in claim 5 together with common means for securing said index plate to said work holder and locking said selector plate in any desired angular position.

8. In an indexing means for a work locating device, a headstock; a work holder journalled for rotation in said headstock; an index disc attached to the workholder for rotation therewith; a latch attached to the headstock and movable toward said index disc; a series of spaced notches in said disc and engageable by said latch to hold said disc and work holder against rotation; a selector plate adjustably mounted on said index disc for rotation therewith but operable to be shifted with respect to said index disc about the axis of said work holder; said selector plate having a plural series of notches, each single series thereof adapted to align with and uncover a predetermined number of notches of said index disc while the unnotched portion of said selector plate overlies the remainder, the predetermined number of notches of each single series of notches being different so that they uncover differently spaced combinations of notches in the disc when the plate is shifted from one to another position with respect to the disc, whereby said selector plate blocks the engagement of said latch with the notches in said disc except those uncovered by the notches in said selector plate, and means for locking said selector plate to said disc at either of its adjusted positions.

CHRISTY A. WIKEN.
ERIC A. REIBIG.

REFERENCES CITED

The following references are of record in the file of this patent:

UNITED STATES PATENTS

| Number | Name | Date |
| --- | --- | --- |
| 343,846 | Phillips | June 15, 1886 |
| 541,550 | Johnson | June 25, 1895 |
| 772,894 | Le Blonde | Oct. 14, 1904 |
| 982,979 | Morton | Jan. 31, 1911 |
| 1,036,720 | Robinson | Aug. 27, 1912 |
| 1,260,130 | Bemis | Mar. 19, 1918 |
| 1,260,271 | Kramer | Mar. 19, 1918 |
| 1,404,243 | Stewart et al. | Jan. 24, 1922 |
| 2,059,753 | Scott et al. | Nov. 3, 1936 |
| 2,144,486 | Erb | Jan. 17, 1939 |
| 2,205,361 | Kearney et al. | June 18, 1940 |
| 2,277,997 | Silva | Mar. 31, 1942 |
| 2,351,246 | Walling | June 13, 1944 |